Nov. 25, 1941.    J. A. PLATTE ET AL    2,263,704
PROCESS FOR CONTINUOUSLY CRYSTALLIZING SUGAR SOLUTIONS
Filed June 4, 1938
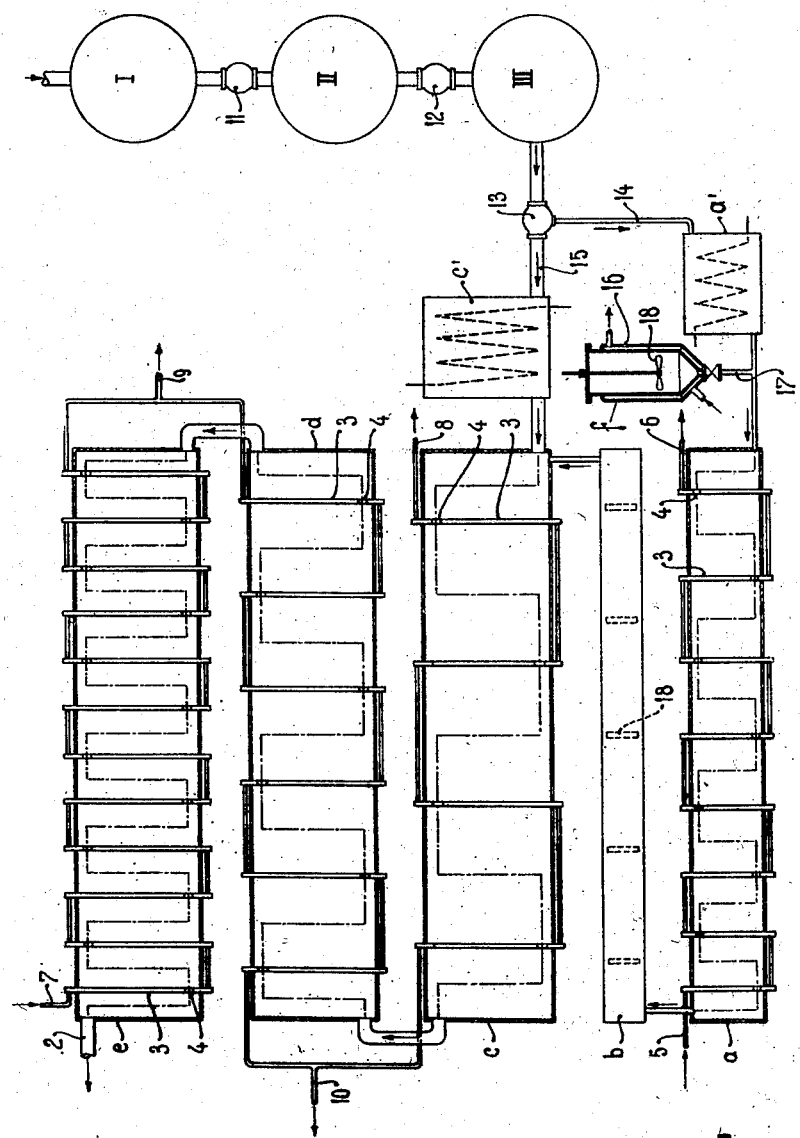
Inventors
Johannes A. Platte
Gerbertus H. de Vries
by [signature]
Atty.

Patented Nov. 25, 1941

2,263,704

UNITED STATES PATENT OFFICE 2,263,704

PROCESS FOR CONTINUOUSLY CRYSTALLIZING SUGAR SOLUTIONS

Johannes Anthonius Platte and Gerbertus Hendrik de Vries, Madioen, Java, Dutch East Indies Application June 4, 1938, Serial No. 211,938
In the Netherlands April 7, 1937

2 Claims. (Cl. 127—58)

This invention relates to a process for continuously crystallizing sugar solutions by subjecting the sugar solution to a preliminary cooling step for the formation of core grains and (or) by adding core grains to the solution, whereupon, in order to maintain a uniform supersaturation of the mother liquor, the mass is subjected to a cooling which increases towards the output end of the process so that increasing amounts of heat are withdrawn from the solution.

The object of the present invention is to improve said process and to this end the core grains are formed in a portion of the solution to be crystallized, whereupon said portion together with the remaining part of the solution is subjected to a further crystallizing treatment. Preferably very fine crystals are added to said portion of the solution, which grow therein to core grains under a uniform supersaturation. Said portion of the solution amounts e. g. only 10% of the total quantity of the solution so that the concentration of the core grains in said portion will be 10 times as large as in the total volume of the mass and in consequence thereof the fine crystals will grow more rapidly. The preparation of the core grains in a portion of the solution may be carried out discontinuously or in a continuous stream. The obtained coarser core grains together with the remaining portion of the solution are then cooled under uniform supersaturation in a continuous stream in order to promote the growth of the crystals. The period of time during which the mass remains in the crystallizers is considerably shorter than when the core grains are under equal conditions formed in the total quantity of the solution so that the capacity of the crystallizing plant is materially increased.

The invention now will be described in detail with reference to the accompanying drawing, which shows a diagrammatical view of a plant for carrying out the process according to the invention.

The solution to be crystallized is first evaporated and this is effected in a multiple evaporation plant the successive pans of which are indicated in the drawing at I, II and III. Contrary to the usual evaporation plants the heating steam is admitted in the steam chamber of pan III, whereas the solution to be evaporated enters in pan I, which is directly connected to a condenser. A pump II delivers the solution in a continuous stream to the pan II from which it is forced to pan III by means of a pump 12. The supply of the solution to pan I and the capacity of the pumps 11 and 12 are regulated in such a manner that a predetermined liquid level is maintained in the evaporation plant. The pump 13 which withdraws the concentrated solution from pan III, controls therefore the rate of flow through the evaporation plant. The solution leaves pan III in a nearly saturated condition and presents a concentration of e. g. 84° Brix. As the solution is exposed in the evaporation plant to a relatively high temperature care should be taken that the period of time during which the solution remains in the evaporation plant is short and the quantity of liquid therein is small. By regulating the delivery of the pump 13 under the influence of the concentration of the solution in pan III a uniform concentration is secured.

The pump 13 forces a portion of the concentrated solution through conduit 14 to a preliminary cooler $a'$ and the remaining part through conduit 15 to a preliminary cooler $c'$. The quantity passing through conduit 14 amounts preferably about $\frac{1}{10}$ of the quantity passing through conduit 15 and when it has passed the preliminary cooler $a'$ said smaller portion flows through a receptacle $a$ provided with cooling elements 3. In the receptacle $a$ the required number of core grains is added to the solution and said latter is subjected to a preliminary crystallization. The supply of the core feeding liquid may be effected continuously and in dependence on the delivery of the pump 13.

The core feeding liquid is prepared in a mixer $f$ provided with a cooling jacket 16 and with a rapidly rotating screw stirrer 18 carried by a vertical shaft. The receptacle $f$ is filled to a certain level with a portion of the concentrated solution withdrawn from the evaporation pan III. Said solution has a concentration of 84° Brix and is cooled down to such a temperature that it presents a supersaturation of 1.2. Thereupon a sugar suspension is added to the cooled supersaturated solution. Said sugar suspension is obtained by grinding fine sugar crystals with spirits whereby crystal cores are obtained the average length of the axis of which is about 0.005 mm. The fine crystal cores grow in the receptacle $f$ to cores the axis of which has an average length of 0.15–0.20 mm.

The solution flowing to the receptacle $a$ is cooled in the cooler $a'$ to a temperature of e. g. 93° C., so that its degree of supersaturation amounts about 1.2. Through the conduit 17 the core feeding liquid is added to the solution entering the receptacle $a$ and the crystal cores grow in said receptacle under uniform supersaturations by the action of the cooling elements 3 to which cooling water is admitted at 5 and withdrawn at 6.

The amount of heat which is to be withdrawn per time-unit from the solution should be considerably increased towards the delivery end of the receptacle. To this end the cooling surface per volume unit of the receptacle increases towards the delivery end. In addition thereto cooling water may be tapped at certain points between the cooling elements so that a smaller quantity of water flows through the cooling elements towards the entry of the receptacle and consequently a smaller amount of heat is withdrawn from the mass. The precrystallized solution leaves the receptacle $a$ with a temperature of e. g. 68° C., whereby the axis of the crystals has obtained a length of about 0.4 mm, and the mass then flows through a receptacle $b$ provided with heating elements 18. In the receptacle $b$ the solution is heated to a temperature above the saturation point e. g. to 91° C. so that its tendency to form crystals is fully removed. The decrease of the length of the axis of the crystal cores in consequence of said increased temperature is practically of no importance. After having passed receptacle $b$ the precrystallized solution flows in receptacle $c$ wherein it meets the main portion discharged from the preliminary cooler $c'$. Said main portion of the solution has been cooled in the cooler $c'$ to a temperature of e. g. 91° C. so that its degree of supersaturation amounts about 1.2. The mass passes through the receptacles $c$, $d$ and $e$ in succession and leaves said latter receptacle at 2 in the desired final condition. The cooling in said receptacles is effected in such a manner that the crystallization takes place under a uniform supersaturation. To this end the receptacle $e$ has a larger cooling surface than receptacle $d$ while the cooling surface of receptacle $d$ is larger than that of receptacle $c$. Moreover the cooling water which enters the left hand side cooling portion 3 of receptacle $e$ at 7 is partially tapped at 9 when leaving the receptacle.

Similarly part of the cooling water is tapped at 10 between the receptacles $d$ and $c$ and the remainder is passed through the partitions 3 of receptacle $c$ and discharged at 8. The cooling may be continued without any objection to a temperature of about 36° C. The obtained product presents a particularly regular type of crystal.

Though in the above described embodiment an equal supersaturation is maintained at the precrystallization in the receptacle $a$ as in the receptacles $c$, $d$ and $e$ the invention is not limited thereto. Under certain conditions it may be preferable to maintain in the receptacle $a$ a lower degree of supersaturation than in the other receptacles.

It should be noticed that the rate of cooling required for maintaining a uniform degree of supersaturation need not necessarily be obtained by providing a cooling surface increasing towards the delivery end or by tapping cooling water between the cooling elements but may also be obtained by passing the cooling water in a constant quantity normally in counter current to the solution to be cooled and by heating the water at the last part of its path by supplying heat from outside.

The preparation of the core grains in receptacle $a$ may be carried out discontinuously which presents the advantage that very uniform and regular core grains are obtained. The solution carrying the core grains is then stored in receptacle $b$ and continuously supplied to the main portion of the solution entering the crystallizer $c$.

What we claim is:

1. A process for crystallizing sugar solutions in a continuous stream, which consists in dividing the stream of the solution free of crystals into a main stream and a relatively small stream, forming core grains in said relatively small stream by subjecting it to a cooling treatment to a degree that the weight of the crystals constitute less than 10% of the final crystals, joining said latter stream to the main stream of the solution and subjecting the combined stream to a cooling treatment by withdrawing increasing and successive amounts of heat therefrom towards the output end of the process so as to maintain a uniform supersaturation of the mother liquor throughout the course of the process.

2. A process for crystallizing sugar solutions in a continuous stream, which consists in dividing the stream of the solution free of crystals into a main stream and a relatively small stream, adding very fine crystals to said relatively small stream and subjecting said stream to a cooling treatment under uniform supersaturation to a degree that the crystals grow without forming new crystals to a weight constituting less than 10% of that of the final crystals, joining said crystallized stream to the main stream of the solution and subjecting the combined stream to a cooling treatment by withdrawing increasing and successive amounts of heat therefrom towards the output end of the process so as to maintain a uniform supersaturation of the mother liquor throughout the course of the process.

JOHANNES A. PLATTE.
GERBERTUS H. de VRIES.